United States Patent
Zomaya et al.

(10) Patent No.: US 8,959,370 B2
(45) Date of Patent: Feb. 17, 2015

(54) SCHEDULING AN APPLICATION FOR PERFORMANCE ON A HETEROGENEOUS COMPUTING SYSTEM

(75) Inventors: Albert Zomaya, Randwick (AU); Young Choon Lee, Croydon (AU)

(73) Assignee: University of Sydney, Sydney, New South Wales (AU)

(*) Notice: Subject to any disclaimer, the term of this patent is extended or adjusted under 35 U.S.C. 154(b) by 889 days.

(21) Appl. No.: 13/121,939

(22) PCT Filed: Oct. 1, 2009

(86) PCT No.: PCT/AU2009/001311
§ 371 (c)(1),
(2), (4) Date: Jun. 20, 2011

(87) PCT Pub. No.: WO2010/037177
PCT Pub. Date: Apr. 8, 2010

(65) Prior Publication Data
US 2011/0239017 A1     Sep. 29, 2011

(30) Foreign Application Priority Data

Oct. 3, 2008 (AU) ................................ 2008905162

(51) Int. Cl.
*G06F 1/00* (2006.01)
*G06F 1/32* (2006.01)
*G06F 9/50* (2006.01)

(52) U.S. Cl.
CPC .............. *G06F 1/3203* (2013.01); *G06F 1/329* (2013.01); *G06F 1/3293* (2013.01);
(Continued)

(58) Field of Classification Search
CPC ..... G06F 1/3203; G06F 1/329; G06F 1/3293; G06F 9/4881; G06F 9/5038; G06F 9/505; G06F 9/5088; G06F 13/1652

USPC .......... 713/300, 320, 323; 718/100, 102, 103
See application file for complete search history.

(56) References Cited

U.S. PATENT DOCUMENTS

| 6,230,303 | B1 * | 5/2001 | Dave ............................ 716/105 |
| 2005/0034002 | A1 | 2/2005 | Flautner | |

(Continued)

FOREIGN PATENT DOCUMENTS

| EP | 1865417 | 12/2007 |
| JP | H06-75786 | 3/1994 |

(Continued)

OTHER PUBLICATIONS

Roychowdhury et al. "A Voltage Scheduling Heuristic for Real-Time Task Graphs." DSN 2003, IEEE.

(Continued)

*Primary Examiner* — Michael J Brown
(74) *Attorney, Agent, or Firm* — Knobbe Martens Olson & Bear LLP

(57) ABSTRACT

The invention concerns scheduling an application comprised of precedence constrained parallel tasks on a high-performance computer system. The computer system has a plurality of processors each enabled to operate on different voltage supply levels. First, a priority order for the tasks based on the computation and communication costs of the tasks is determined. Next, the based on the priority order of the tasks, assigning each task both a processor and a voltage level that substantially minimizes energy consumption and completion time for performing that task when compared to energy consumption and completion time for performing that task on different combinations of processor and voltage level. It is an advantage of the invention that the scheduling takes account not only completion time (makespan), but also energy consumption. Aspects of the invention include a method, software, a scheduling module of a computer and a schedule.

17 Claims, 12 Drawing Sheets

(52) U.S. Cl.
CPC ........... *G06F 9/5038* (2013.01); *G06F 9/5094* (2013.01); *Y02B 60/121* (2013.01); *Y02B 60/142* (2013.01); *Y02B 60/144* (2013.01)
USPC ........... 713/320; 713/300; 713/323; 718/100; 718/102; 718/103

(56) References Cited

U.S. PATENT DOCUMENTS

| | | |
|---|---|---|
| 2006/0253715 A1 | 11/2006 | Ghiasi et al. |
| 2007/0283358 A1 | 12/2007 | Kasahara et al. |
| 2008/0178029 A1 | 7/2008 | McGraine et al. |

FOREIGN PATENT DOCUMENTS

| | | |
|---|---|---|
| JP | 2004-509386 | 3/2004 |
| JP | 2007-328415 | 12/2007 |
| JP | 2008-176804 | 7/2008 |

OTHER PUBLICATIONS

Bozdag et al. "A task duplication based bottom-up scheduling algorithm for heterogeneous environments." Proc. Int'l Parallel and Distributed Processing Symp. (Apr. 2005).
Cormen et al. "Introduction to Algorithms." MIT Press, 1990.
Garey et al. "Computers and Intractability: A Guide to the Theory of NP-Completeness." W.H. Freeman and Co. pp. 238-239 (1979).
Hong et al. "Power Optimization of Variable-Voltage Core-Based Systems." IEEE Transactions on Computer-Aided Design of Integrated Circuits and Systems. 18(12). (Dec. 12, 1999). Online: accessed Apr. 7, 2009. URL: http://www.cs.berkeley.edu/~culler/cs252-s02/papers/lpScheduling.pdf.
International Search Report for International Application No. PCT/AU2009/001311 dated Nov. 30, 2009.
Koch, G. "Discovering multi-core: extending the benefits of Moore's law." Technology @Intel Magazine, Jul. 2005 (http://www.intel.com/technology/magazine/computing/multi-core-0705.pdf).
Koomey, J.G. "Estimating total power consumption by servers in the U.S. and the world."
Kwok, Yu-Kwong and Ahmad, Ishfaq. "Benchmarking the Task Graph Scheduling Algorithms." 1998, Proceedings of the 12th. International Parallel Processing Symposium on International Parallel Processing Symposium, pp. 531.
Langen et al. "Multiprocessor Scheduling to Reduce Leakage Power." 16th Annual Workshop on Circuits, Systems, and Signal Processing, pp. 383-389, Nov. 2005.
Lord et al. "Solving Linear Algebraic Equations on an MIMD Computer." J. ACM. 30(1):103-117 (Jan. 1983).
Merkel et al. "Balancing Power Consumption in Multiprocessor Systems." EuroSys. pp. 403-414 (Apr. 6, 2006). Online: accessed Apr. 7, 2009. URL: http://www.ece.rochester.edu/~albonesi/research/papers/hpca02.pdf.
Semerao et al. "Energy-Efficient Processor Design Using Multiple Clock Domains with Dynamic Voltage and Frequency Scaling." Dept. of Computer Science and Electrical and Computer Engineering, University of Rochester, 2002.
Topcuouglu et al. "Performance-Effective and Low-Complexity Task Scheduling for Heterogeneous Computing." IEEE Trans. Parallel Distrib. Syst. 13(3):260-274 (2002).
Wu et al. A Programming Aid for Message-Passing Systems. IEEE Trans. Parallel and Distributed Systems. 1(3):330-343 (Jul. 1990).
Zhu et al. "Scheduling with Dynamic Voltage/Speed Adjustment Using Slack Reclamation in Multiprocessor Real-Time Systems." IEEE Trans. Parallel Distrib. Syst., vol. 14, No. 7, pp. 686-700.
Chinese Office Action for Chinese Application No. 20098013950.2 dated Feb. 18, 2014.
Japanese Office Action for Japanese Patent Application No. 2011-529417 dated Nov. 26, 2013.

\* cited by examiner

| Level | Pair 1 | | Pair 2 | | Pair 3 | | Pair 4 | |
|---|---|---|---|---|---|---|---|---|
| | Voltage ($v_k$) | Relative speed (%) | Voltage ($v_k$) | Relative speed (%) | Voltage ($v_k$) | Relative speed (%) | Voltage ($v_k$) | Relative speed (%) |
| 0 | 1.50 | 100 | 2.20 | 100 | 1.75 | 100 | 1.50 | 100 |
| 1 | 1.40 | 90 | 1.90 | 85 | 1.40 | 80 | 1.20 | 80 |
| 2 | 1.30 | 80 | 1.60 | 65 | 1.20 | 60 | 0.90 | 50 |
| 3 | 1.20 | 70 | 1.30 | 50 | 0.90 | 40 | | |
| 4 | 1.10 | 60 | 1.00 | 35 | | | | |
| 5 | 1.00 | 50 | | | | | | |
| 6 | 0.90 | 40 | | | | | | |

Fig. 1

| Task | b-level | t-level |
|------|---------|---------|
| 0 | 101.33 | 0.00 |
| 1 | 66.67 | 22.00 |
| 2 | 63.33 | 28.00 |
| 3 | 73.00 | 25.00 |
| 4 | 79.33 | 22.00 |
| 5 | 41.67 | 56.33 |
| 6 | 37.33 | 64.00 |
| 7 | 12.00 | 89.33 |

Fig. 3

| Task | $p_0$ | $p_1$ | $p_2$ |
|---|---|---|---|
| 0 | 11 | 13 | 9 |
| 1 | 10 | 15 | 11 |
| 2 | 9 | 12 | 14 |
| 3 | 11 | 16 | 10 |
| 4 | 15 | 11 | 19 |
| 5 | 12 | 9 | 5 |
| 6 | 10 | 14 | 13 |
| 7 | 11 | 15 | 10 |

Fig. 4

Algorithm ECS
Input: A DAG $G(N, E)$ and a set $P$ of DVS-enabled processors
Output: A schedule $S$ of $G$ onto $P$ determine priority order {
1. Compute b-level of $\forall n_i \in N$
2. Sort $N$ in decreasing order by b-level value
}

ECS and ECS+idle {
3. for $\forall n_i \in N$ do
4.    Let $p' = p_0$
5.    Let $v' = v_{0,0}$
6.    for $\forall p_j \in P$ do
7.      for $\forall v_{j,k} \in V_j$ do
8.        Compute $RS(n_i, p_j, v_{j,k}, p', v')$ value with $p'$ and $v'$
9.        if $RS(n_i, p_j, v_{j,k}, p', v') > RS(n_i, p', v', p_j, v_{j,k})$ then
10.          Replace $p'$ and $v'$ with $p_j$ and $v_{j,k}$
11.        end if
12.      end for
13.    end for
14.    Assign $n_i$ on $p'$ with $v'$
15. end for
}

MCER {
16. Let $S$ = the current schedule
17. for $\forall n_i \in N$ do
18.    Remove $n_i$ in $S$
19.    Let $p'$ = the processor on which $n_i$ is currently scheduled
20.    Let $v'$ = the VSL selected for $p'$
21.    for $\forall p_j \in P$ do
22.      for $\forall v_{j,k} \in V_j$ do
23.        Compute $E_d(n_i, p_j, v_{j,k})$
24.        Recompute makespan
25.        if no increase in makespan and $E_d(n_i, p_j, v_{j,k}) < E_d(n_i, p', v')$ then
26.          Replace $p'$ and $v'$ with $p_j$ and $v_{j,k}$
27.        end if
28.      end for
29.    end for
30.    Reassign $n_i$ on $p'$ with $v'$
31. end for
}

Fig. 6

| algo. task | HEFT time | HEFT energy ($E_d$) | DBUS time | DBUS energy ($E_d$) | ECS-MCER time | ECS-MCER energy ($E_d$) | ECS+MCER time | ECS+MCER energy ($E_d$) | ECS+idle-MCER time | ECS+idle-MCER energy ($E_d$) | ECS+idle+MCER time | ECS+idle+MCER energy ($E_d$) |
|---|---|---|---|---|---|---|---|---|---|---|---|---|
| $n_0$ | 9 | 43.56 | 11 / 13 / 9 | 29.25 / 33.69 / 43.56 | 11 | 33.69 | 11 | 33.69 | 11 | 33.69 | 11 | 33.69 |
| $n_1$ | 15 | 33.75 | 11 | 53.24 | 10 | 30.63 | 13 | 25.48 | 10 | 30.63 | 20 | 31.00 |
| $n_2$ | 14 | 67.76 | 9 | 27.56 | 11 | 21.56 | 11 | 21.56 | 11 | 21.56 | 23 | 18.63 |
| $n_3$ | 12 | 36.75 | 17 | 38.25 | 15 | 29.40 | 15 | 29.40 | 12 | 36.75 | 12 | 36.75 |
| $n_4$ | 19 | 91.96 | 19 | 91.96 | 11 | 24.75 | 16 | 23.04 | 11 | 24.75 | 13 | 23.66 |
| $n_5$ | 5 | 24.20 | 9 | 20.25 | 5 | 24.20 | 6 | 21.66 | 5 | 24.20 | 8 | 20.48 |
| $n_6$ | 11 | 33.69 | 13 | 62.92 | 15 | 33.75 | 15 | 33.75 | 15 | 33.75 | 15 | 33.75 |
| $n_7$ | 10 | 48.40 | 10 | 48.40 | 10 | 48.40 | 10 | 48.40 | 10 | 48.40 | 10 | 48.40 |
| $E_d$ | | 380.07 | | 449.08 | | 246.38 | | 236.98 | | 253.73 | | 246.36 |
| $E_i$ | | 145.40 | | 81.47 | | 127.60 | | 120.13 | | 122.17 | | 84.13 |
| $E_t$ | | 525.47 | | 530.55 | | 373.98 | | 357.11 | | 375.90 | | 330.49 |

Fig. 10

| Parameter | Value |
| --- | --- |
| The number of tasks | U(10, 600) |
| CCR | {0.1, 0.2, 1.0, 5.0, 10.0} |
| The number of processors | {2, 4, 8, 16, 32, 64} |
| Processor heterogeneity | {100, 200, random} |

Fig. 11

| Algorithm | HEFT over ECS | | DBUS over ECS | | HEFT over ECS+idle | | DBUS over ECS+idle | | ECS over ECS+idle | |
|---|---|---|---|---|---|---|---|---|---|---|
| DAG set | makespan | energy | makespan | energy | makespan | energy | makespan | energy | makespan | energy |
| Random | 2% | 19% | 5% | 49% | 3% | 29% | 7% | 56% | 3% | 7% |
| FFT | <1% | 17% | 16% | 43% | 2% | 23% | 18% | 49% | 2% | 3% |
| Laplace | 1% | 11% | 22% | 45% | 4% | 15% | 19% | 54% | <1% | 11% |
| LU | -3% | 16% | 2% | 33% | 0% | 21% | 5% | 44% | 2% | 5% |
| Average | 0% | 16% | 11% | 43% | 2% | 22% | 13% | 51% | 2% | 7% |

SCHEDULING AN APPLICATION FOR PERFORMANCE ON A HETEROGENEOUS COMPUTING SYSTEM

CROSS-REFERENCE TO RELATED APPLICATIONS

This application claims the benefit and priority to and is a U.S. National Phase application of PCT International Application No. PCT/AU2009/001311, filed Oct. 1, 2009, designating the United States of America and published in the English language, which is an International Application of and claims the benefit of priority to Australian Application No. 2008905162, filed Oct. 3, 2008. The disclosures of the above-referenced applications are hereby expressly incorporated by reference in their entireties.

TECHNICAL FIELD

The invention concerns scheduling an application for performance on a heterogeneous computing system. In particular, but not limited to, the invention concerns scheduling an application comprised of precedence constrained parallel tasks on a multi-processor computer system comprised of a plurality of processors each enabled to operate on different voltage supply levels. Aspects of the invention include a method, software, a scheduling module of a computer and a schedule.

BACKGROUND ART

Stiff increases in the volume of both computation and data over the past few decades have spurred computer architecture researchers and designers to focus on high performance; this results in the development of resource-intensive technologies, such as multi-core microprocessors, high capacity storage devices, and super-speed communications devices. The efficient use of these powerful resources has always been an essential issue, particularly for multiprocessor computer systems (MCSs), such as grids and clouds, in which there are a multitude of processors often as many as hundreds of thousands of them.

Since precedence-constrained parallel applications in scientific and engineering fields are the most typical application model, the problem of scheduling these applications (task scheduling) both on homogeneous and heterogeneous computing systems has been studied extensively over the past few decades. However, most efforts in task scheduling have focused on two issues, the minimization of application completion time (makespan/schedule length) and time complexity; in other words, the main objective of a task scheduling algorithm is the generation of the optimal schedule for a given application with the minimal amount of scheduling time.

It is only recently that much attention has been paid to energy consumption in scheduling, particularly on high-performance computing systems (HPCSs). The energy consumption issue in these HPCSs raises various monetary, environmental and system performance concerns. A recent study on power consumption by servers [2] shows that electricity use for servers worldwide—including their associated cooling and auxiliary equipment—in 2005 cost 7.2 billion US dollars. The study also indicates that electricity consumption in that year had doubled compared with consumption in 2000. Clearly, there are environmental issues with the generation of electricity.

The number of transistors integrated into today's Intel Itanium 2 processor reaches to nearly 1 billion. If this rate continues, the heat (per square centimeter) produced by future Intel processors would exceed that of the surface of the sun [3]; this implies the possibility of worsening system reliability, eventually resulting in poor system performance.

SUMMARY OF THE INVENTION

In a first aspect the invention provides a method for scheduling an application for performance on a heterogeneous computing system, wherein the application is comprised of two or more precedence constrained parallel tasks and the heterogeneous computing system is comprised of multiple processors each enabled to operate on different voltage supply levels, the method comprising the step of:
  determining a priority order for the tasks based on the computation and communication costs of the tasks; and
  in the priority order of the tasks, assigning each task both a processor and a voltage level that substantially minimises energy consumption and completion time for performing that task when compared to energy consumption and completion time for performing that task on different combinations of processor and voltage level.

It is an advantage of the invention that the scheduling takes account not only completion time (makespan), but also energy consumption. The invention is able to take account of the different capacities of the processors that form part of the heterogeneous network to assign, in priority order, tasks to the processors at a particular voltage level in a way that balances both completion time and energy consumption.

Substantially minimising may comprise determining for different combinations of task, processor and voltage level, a factor that represents both the energy consumption and time completion. The factor may be comprised of multiple factors.

This may involve selecting the combination for assignment having a factor that represents substantially the best trade off between minimising energy consumption and minimising completion time.

Determining the factor for energy consumption may be based on a computation cost of that task at the voltage level of that combination.

Determining the factor for completion time may be based on a computation cost of that task on the processor and voltage level of that combination.

Determining the factor for completion time may be based on a summation of the estimated start time and the computation cost of that task on the processor and voltage level of that combination. The estimated start time may be based on an estimated finish time of a most influential task that precedes the task and, where appropriate, the communication cost between the processor assigned the most influential task to the processor of that combination.

Determining the factor for completion time may comprise penalising tasks on processor and voltage combinations that produce longer task completion.

For each task, the method may further comprise the step of:
  determining the energy consumption and computation time for the task on different combinations of processor and voltage level;
  if for a combination the determined computation time does not cause an increase a makespan of the application, and the determined energy consumption is less than the energy consumption of the task on the assigned processor and assigned voltage, reassigning the task to that combination of processor and voltage level. It is an advantage of this embodiment of the invention that the schedule can be assessed to identify whether any changes to the schedule will result in a further reduction of energy consumption without an increase in makespan.

The priority of each task may be based on computation and communication costs of each task respectively along the longest path of precedence constrained tasks that the task is a part of. The priority of each task is based on the b-level or t-level of the task.

The method may further comprise the step of performing the tasks according to the scheduling.

The heterogeneous computing system is a multi-processor computing system, such as a high-performance computing system, and the tasks may be heterogeneous.

In a further aspect the invention provides software, comprising computer instructions recorded on a computer readable medium, to operate a computer to perform the method described above.

In yet another aspect the invention provides a schedule for performing an application on a heterogeneous computing system produced from the method described above.

In another aspect the invention provides a scheduling system to schedule applications for performance on a heterogeneous computing system, wherein the application is comprised of precedence constrained parallel tasks and the heterogeneous computing system is comprised of multiple processors each enabled to operate on different voltage supply levels, the scheduling module operable to:

determine a priority order for the tasks based on their respective computation and communication costs; and for each task and according to the priority order of the tasks, assign a task both a processor and a voltage level that substantially minimises the energy consumption and completion time for performing the task when compared to assigning the task to different combinations of processor and voltage level.

BRIEF DESCRIPTION OF THE DRAWINGS

An example of the invention will now be described with reference to the accompanying drawings, in which:

FIG. 1 is a table showing the voltage-relative speed pairs used in this example;

FIG. 3 is a table showing the t-level and b-level task priorities of the tasks shown in FIG. 1;

FIG. 4 is a table showing the computation costs of the tasks shown in FIG. 1;

FIG. 6 shows the method of energy conscious scheduling (ECS) of this example, and includes makespan-conservative energy reduction (MCER);

FIG. 10 is a table comparing the energy consumption of the schedules generated by the six different methods of FIGS. 7, 8 and 9;

FIG. 11 is a table summarizing the parameters used in the experiments detailed below; and FIG. 12 is a is a table showing the comparative results of the experiments detailed below.

BEST MODES OF THE INVENTION

Figure 2:
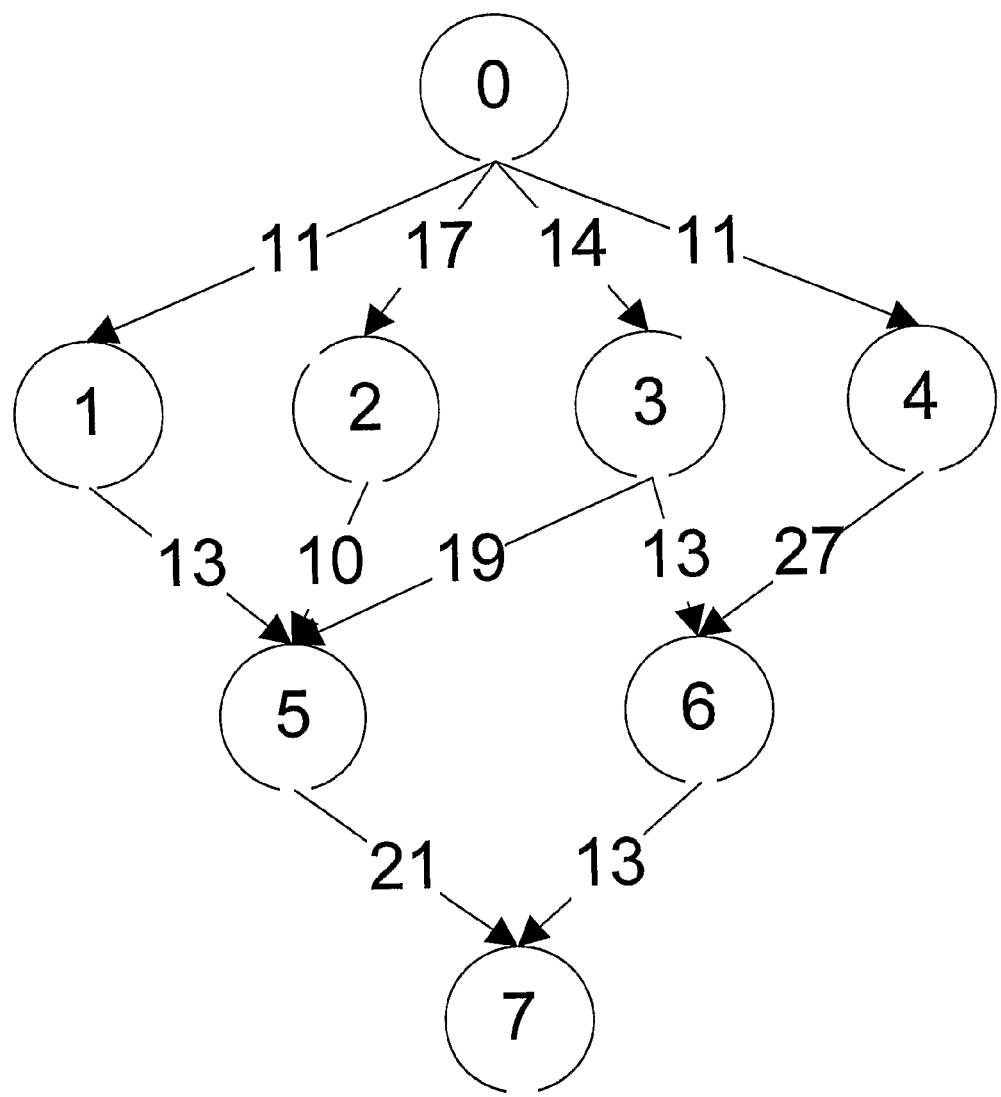
FIG. 2 shows a simple task graph of an application used in this example.

In this example, fifty heterogeneous processors that form a computer cluster are provided. The processors are able to operate on different voltage supply levels and are interconnected in a uniform or random way using high bandwidth connections, such as processors stacked on shelves. The computer cluster is responsible for performing an application that is comprised of multiple precedence constrained parallelable tasks, for example multiple pattern matching analyses on a large data set. In this example, priori information about each task is known and performance of the application is not based on real-time deadlines.

One processor, known here as scheduling system, is responsible for generating a schedule. The scheduling system may form part of the cluster or may be in addition to the cluster. The scheduling system is able to receive and store information about the processors, possible voltage levels of each processor and the tasks and is able to use this information to generate a schedule in the manner described below. The scheduling system also causes each processor to receive their respective parts of the schedule. That is, the generated schedule assigns a task to a particular processor and voltage. Each task receives information about the tasks and assigned voltage level for that task and time for performance either directly or indirectly from the scheduling system.

In this example an energy conscious scheduling (ECS) heuristic that takes into account not only makespan, but also energy consumption will be described. The heuristic can easily be applied to loosely coupled HPCSs using advance reservations and various sets of frequency-voltage pairs. ECS is devised with the incorporation of dynamic voltage scaling (DVS) to reduce energy consumption. This means that there is a trade-off between the quality of schedules (makespans) and energy consumption.

ECS effectively deals with this trade-off balancing these two performance considerations. In addition, the energy reduction phase using the MCER technique is incorporated into ECS. In the MCER phase, the current schedule generated in the scheduling phase is scrutinized to identify whether any changes to the schedule further reduce energy consumption without an increase in makespan. The low time complexity of ECS should also be noted.

We now describe the system, application, energy and scheduling models used in this example.

System Model

The target system used in this work consists of a set P of p heterogeneous processors/machines that are fully interconnected. Each processor $p_j \in P$ is DVS-enabled; in other words, it can operate in different VSLs (i.e., different clock frequencies). For each processor $p_j \in P$, a set $V_j$ of v VSLs is random and uniformly distributed among four different sets of VSLs (see FIG. 1). Processors consume energy while idling, that is when a processor is idling it is assumed the lowest voltage is supplied. Since clock frequency transition overheads take a negligible amount of time (e.g., 10 μs-150 μs), these overheads are not considered in this example. The inter-processor communications are assumed to perform with the same speed on all links without contentions. It is also assumed that a message can be transmitted from one processor to another while a task is being executed on the recipient processor which is possible in many systems.

Application Model

Parallel programs, in general, can be represented by a directed acyclic graph (DAG). A DAG, G=(N, E), consists of a set N of n nodes and a set E of e edges. A DAG is also called a task graph or macro-dataflow graph. In general, the nodes represent tasks partitioned from an application; the edges represent precedence constraints. An edge (i, j)∈E between task $n_i$ and task $n_j$ also represents inter-task communication. In other words, the output of task $n_i$ has to be transmitted to task $n_j$ in order for task $n_j$ to start its execution. A task with no predecessors is called an entry task, $n_{entry}$, whereas an exit task, $n_{exit}$, is one that does not have any successors. Among the predecessors of a task the predecessor which completes the communication at the latest time is called the most influential parent (MIP) of the task denoted as MIP($n_i$). The longest path of a task graph is the critical path (CP).

The weight on a task $n_i$ denoted as $w_i$ represents the computation cost of the task. In addition, the computation cost of the task on a processor $p_j$, is denoted as $w_{i,j}$ and its average computation cost is denoted as $\overline{w}_i$.

The weight on an edge, denoted as $c_{i,j}$ represents the communication cost between two tasks, $n_i$ and $n_j$. However, a communication cost is only required when two tasks are assigned to different processors. In other words, the communication cost when tasks are assigned to the same processor can be ignored, i.e., 0.

The earliest start time of, and the earliest finish time of, a task $n_i$ on a processor $p_j$ is defined as $$EST(n_i, p_j) = \begin{cases} 0 & \text{if } n_i = n_{entry} \\ EFT(MIP(n_i), p_k) + c_{MIP(n_i),i} & \text{otherwise} \end{cases} \quad (1)$$

where $p_k$ is the processor on which the MIP of task $n_i$ is scheduled.

$$EFT(n_i, p_j) = EST(n_i, p_j) + w_{i,j} \quad (2)$$

Note that the actual start and finish times of a task $n_i$ on a processor $p_j$, denoted as AST($n_i$, $p_j$) and AFT($n_i$, $p_j$) can be different from its earliest start and finish times, EST($n_i$, $p_j$) and EFT($n_i$, $p_j$), if the actual finish time of another task scheduled on the same processor is later than EST($n_i$, $p_j$).

In the case of adopting task insertion the task can be scheduled in the idle time slot between two consecutive tasks already assigned to the processor as long as no violation of precedence constraints is made. This insertion scheme would contribute in particular to increasing processor utilization for a communication intensive task graph with fine-grain tasks.

A simple task graph is shown in FIG. 2 with its details in tables of FIGS. 3 and 4. The values presented in the table of FIG. 3 are computed using two frequently used task prioritization methods, t-level and b-level. Note that, both computation and communication costs are averaged over all modes and links. The t-level of a task is defined as the summation of the computation and communication costs along the longest path of the node from the entry task in the task graph. The task itself is excluded from the computation. In contrast, the b-level of a task is computed by adding the computation and communication costs along the longest path of the task from the exit task in the task graph (including the task). The b-level is used in this example.

The communication to computation ratio (CCR) is a measure that indicates whether a task graph is communication intensive, computation intensive or moderate. For a given task graph, it is computed by the average communication cost divided by the average computation cost on a target system.

Energy Model

Our energy model is derived from the power consumption model in complementary metal-oxide semiconductor (CMOS) logic circuits. The power consumption of a CMOS-based microprocessor is defined to be the summation of capacitive, short-circuit and leakage power. The capacitive power (dynamic power dissipation) is the most significant factor of the power consumption. The capacitive power ($P_c$) is defined as $$P_c = ACV^2 f \quad (3)$$

where A is the number of switches per clock cycle, C is the total capacitance load, V is the supply voltage, and f is the frequency. Equation 3 clearly indicates that the supply voltage is the dominant factor; therefore, its reduction would be most influential to lower power consumption.

Since processors consume a certain amount of energy while idling, the total energy consumption of the execution for a precedence-constrained parallel application used in this example is comprised of direct and indirect energy consumption. The direct energy consumption 58 is defined as $$E = \sum_{i=1}^{n} ACV_i^2 f \cdot w_i^* = \sum_{i=1}^{n} \alpha V_i^2 w_i^* \quad (4)$$

where $V_i$ is the supply voltage of the processor on which task $n_i$ executed, and $w_i^*$ is the computation cost of task $n_i$ (the amount of time taken for $n_i$'s execution) on the scheduled processor.

On the other hand, the indirect energy consumption 60 is defined as:

$$E_i = \sum_{j=1}^{p} \sum_{idle_{j,k} \in IDLE_j} \alpha V_{j,low}^2 t_{j,k} \quad (5)$$

where $IDLE_j$ is the set of idling slots on processor $p_j$, $V_{j,low}$ is the lowest supply voltage on $p_j$, and $t_{j,k}$ is the amount of idling time for $idle_{j,k}$. Then, the total energy consumption is defined as $$E_t = E_d + E_i \quad (6)$$

Figure 5:
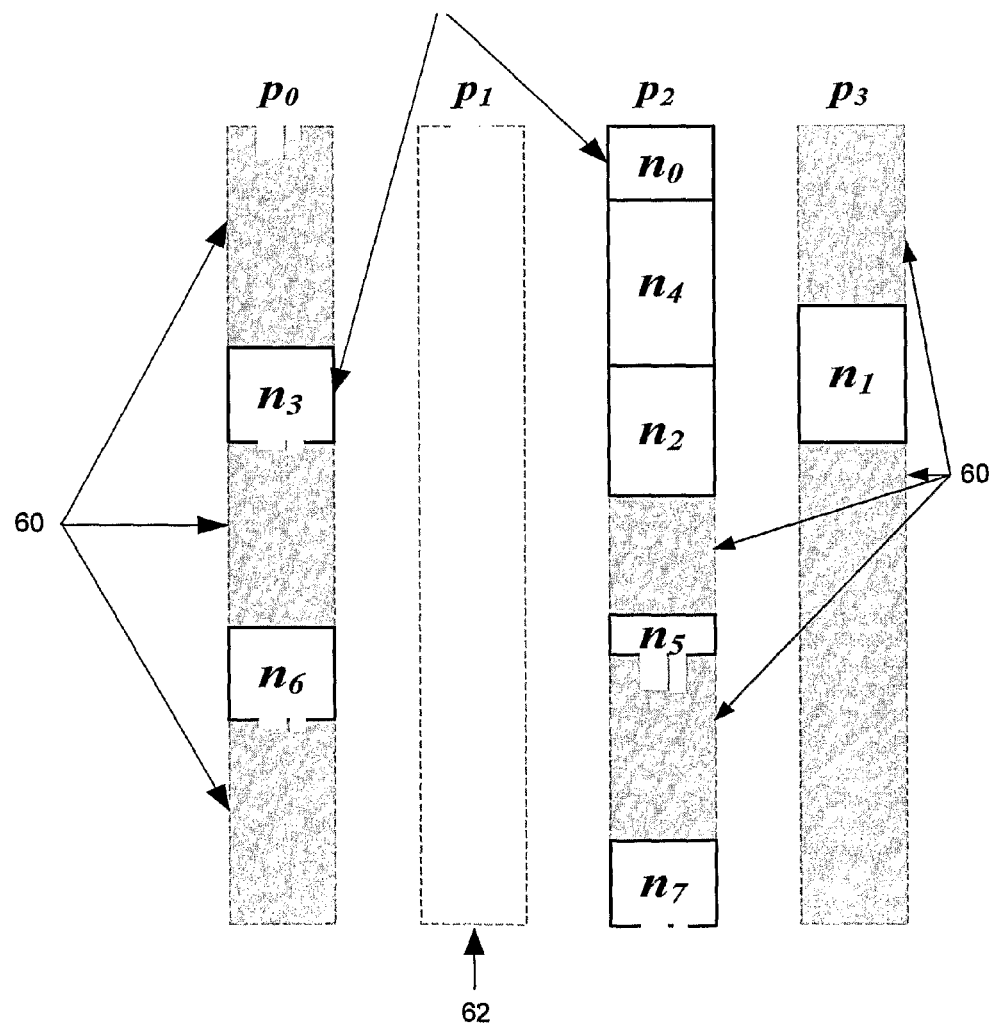
FIG. 5 shows the energy modes of this example.

The pictorial representation of our energy model is presented in FIG. 5. Note that an idling slot 60 is defined to be any period of time (during the execution of a given task graph) in which no task executes. We assume that the energy consumption of unused processors 62 is negligible and thus they are not taken into account when calculating energy consumption.

Scheduling Model

The task scheduling problem in this example is the process of allocating a set N of n tasks to a set P of p processors—without violating precedence constraints—aiming to minimize makespan with energy consumption as low as possible. The makespan is defined as M=max{AFT($n_{exit}$)} after the scheduling of n tasks in a task graph G is completed. Although the minimization of makespan is crucial, tasks of a DAG in our example are not associated with deadlines as in real-time systems. Since the two objectives (minimization of makespan and energy consumption) in our scheduling model conflict with each other, scheduling decisions should be made accounting for the impact of each of those objectives on the quality of schedule.

We will now describe two noteworthy works in task scheduling, particularly for MCSs, and then scheduling algorithms with power/energy consciousness.

Scheduling in MCSs

Due to the NP-hard nature of the task scheduling problem in general cases [4], heuristics are the most popularly adopted scheduling model, and they deliver good solutions in less than polynomial time. Heuristics are characterized by their essentially deterministic operation: the choice of solutions to a scheduling problem is not stochastic. Among the different heuristic techniques, list scheduling, clustering-based scheduling and guided random search are the three most prevalent approaches. List scheduling heuristics are the dominant heuristic model. This is because empirically, list scheduling algorithms tend to produce competitive solutions with lower time complexity compared to algorithms in the other categories.

The HEFT algorithm [1] is highly competitive in that it generates a schedule length comparable to other scheduling algorithms, with a low time complexity. It is a list-scheduling heuristic consisting of the two typical phases of list scheduling (i.e., task prioritization and processor selection) with task insertion.

Before scheduling begins, the b-level values of all tasks in a task graph are computed and arranged in a scheduling list in decreasing order of their b-level values. Each task is then scheduled, starting from the first task in the scheduling list. In the processor selection phase, the processor, $p_j$, on which the finish time of a task $n_i$, $EFT(n_i, p_j)$ is minimized, is selected using an insertion-based policy. In other words, a task can be inserted into the earliest time slot between two already-scheduled tasks on a processor if the precedence constraint of that task is not violated and the slot is large enough to accommodate the task. The time complexity of HEFT is on the order of $O(n \log n + (e+n)p)$.

The DBUS algorithm [5] is a duplication-based scheduling heuristic that first performs a CP-based listing for tasks and schedules them with both task duplication and insertion. The experimental results in [5] show its attractive performance, especially for communication-intensive task graphs.

As its name implies, DBUS schedules tasks in a task graph, traversing it in a bottom-up fashion. In the listing phase, it first computes the b-level, t-level and st-level values of the tasks and identifies the CP tasks. The CP tasks are stored in a list in decreasing t-level order along with the child tasks of each of these CP tasks, such that the child tasks of a CP task precede the CP task. These child tasks are stored in decreasing st-level order. The only distinction between the t- and st-levels is that communication costs are not considered in the st-level. The order of the tasks in the list determines the scheduling order.

In the scheduling phase, each task in the list is scheduled and duplicated as many times as either the number of its child tasks already scheduled or the number of processors—whichever is less. The processor to which a child task is assigned is regarded as a processor that should be covered. For each processor to be covered, a copy of the task to be scheduled is assigned to a particular processor on which its completion time is minimized, and the child task on the former processor can then start as it was originally scheduled. This process repeats until all processors to be covered are actually covered. It is possible that a single task assignment can cover more than one processor. One drawback of this duplication scheme is that there might be a significant increase in schedule length if the number of processors is very small compared to the number of tasks; this is because, although redundant duplications of a task might be effective for the task itself, its replicas can cause a 'cascade effect', in which the replicas invoke too many subsequent duplications. The time complexity of DBUS is in the order of $O(n^2 p^2)$.

Scheduling with Energy Consciousness

Various techniques including dynamic voltage scaling (DVS), resource hibernation, and memory optimizations have been investigated and developed to conserve energy. Since CPUs are the major source of power consumption in HPCSs [9], many microprocessor manufacturers including Intel, AMD, Motorolla and Transmeta have put a lot of effort into low-power processor design focusing on DVS. DVS enables processors to dynamically adjust voltage supply levels (VSLs) aiming to reduce power consumption; however, this reduction is achieved at the expense of sacrificing clock frequencies. Slack management/reclamation is a frequently adopted scheduling technique with DVS.

As in most multi-objective optimization problems, the goal in this scheduling example is to find Pareto-optimal solutions since the performance objectives of the problem most likely to be in conflict with each other. In other words, for a given task graph, the heuristics presented in this example to generate a schedule that minimizes both the makespan and energy consumption; however, the reduction in energy consumption is often made lowering supply voltage and this results in an increase in makespan. More formally, a multi-objective optimization problem can be defined as:

$$\min_{x \in S}[f_1(x), f_2(x), \ldots, f_n(x)] \quad (7)$$

where S is the feasible search space and $n \geq 2$.

Below two energy-conscious scheduling heuristics ECS and ECS+idle are described. They can be described as multi-pass (two-pass) algorithms—the main scheduling pass and the makespan-conservative energy reduction pass.

The working of ECS is shown in FIG. 6.

The incorporation of energy consumption into task scheduling adds another layer of complexity to an already intricate problem. Unlike real-time systems, applications in this example are not deadline-constrained; this indicates that evaluation of the quality of schedules is not straightforward, rather the quality of schedules should be measured explicitly considering both makespan and energy consumption. For this reason, ECS is devised with relative superiority (RS) as a novel objective function, which takes into account these two performance considerations. The RS value (or factor) of a task $n_i$ on a processor $p_j$ with a VSL $v_{j,k}$ is defined as $$RS(n_i, p_j, v_{j,k}) = -\left(\left(\frac{E(n_i, p_j, v_{j,k}) - E(n_i, p', v')}{E(n_i, p_j, v_{j,k})}\right) + \left(\frac{EFT(n_i, p_j, v_{j,k}) - EFT(n_i, p', v')}{EFT(n_i, p_j, v_{j,k}) - \min(EST(n_i, p_j, v_{j,k}), EST(n_i, p', v'))}\right)\right) \quad (8)$$

where $E(n_i, p_j, v_{j,k})$ and $E(n_i, p', v')$ are the energy consumption of $n_i$ on $p_j$ with $v_{j,k}$ and that of $n_i$ on p' with v', respectively, and similarly the earliest start/finish times of the two task-processor allocations are denoted as $EST(n_i, p_j, v_{j,k})$ and $EST(n_i, p', v')$, and $EFT(n_i, p_j, v_{j,k})$ and $EFT(n_i, p', v')$. As can be seen the RS value makes a trade off between the energy consumption and completion time.

For a given ready task, its RS value on each processor is computed using the current best combination of processor and VSL (p' and v') for that task, and then the processor—from which the maximum RS value is obtained—is selected (see steps 3-15 of FIG. 6).

Since each scheduling decision that ECS makes tends to be confined to a local optimum, another energy reduction technique (MCER) is incorporated with the energy reduction phase of ECS without sacrificing time complexity (Steps 17-31 of FIG. 6). It is an effective technique in lowering energy consumption, although the technique may not help schedules escape from local optima.

MCER is makespan conservative in that changes it makes (to the schedule generated in the scheduling phase) are only validated if they do not increase the makespan of the schedule. For each task in a DAG, MCER considers all of the other combinations of task, host and VSL to check whether any of these combinations reduces the energy consumption of the task without increasing the current makespan.

The working of ECS+idle will now be described.

For a given schedule, it is normally the case that a shorter makespan yields less energy consumption due primarily to the energy consumption associated with idling slots of processors within the schedule. This observation leads us to make modifications to the previous RS objective function and the MCER technique in order to incorporate indirect energy consumption.

The previous RS objective function is revised to make the second term more effective in terms of reduction in indirect energy consumption. This change enforces (for two task-processor combinations in comparison) the processor-VSL match that delivers a shorter task completion time to impact more on the final RS value (i.e. penalizing those with longer task completion).

$$RS(n_i, p_j, v_{j,k}, p', v') =$$

$$\begin{cases} \left( \left( \frac{E(n_i, p_j, v_{j,k}) - E(n_i, p', v')}{E(n_i, p_j, v_{j,k})} \right) + \right. \\ \left. -\left( \frac{EFT(n_i, p_j, v_{j,k}) - EFT(n_i, p', v')}{EFT(n_i, p_j, v_{j,k}) - EST(n_i, p_j, v_{j,k})} \right) \right) & \text{if } EFT(n_i, p_j, v_{j,k}) < EFT(n_i, p', v') \\ \left( \left( \frac{E(n_i, p_j, v_{j,k}) - E(n_i, p', v')}{E(n_i, p_j, v_{j,k})} \right) + \right. \\ \left. -\left( \frac{EFT(n_i, p', v') - EFT(n_i, p_j, v_{j,k})}{EFT(n_i, p', v') - EFT(n_i, p', v')} \right) \right) & \text{if } EFT(n_i, p_j, v_{j,k}) \geq EFT(n_i, p', v') \end{cases}$$

The change made to the previous MCER technique in ECS is in its energy function. That is, reassignment decisions are made based on the actual energy consumption metric ($E_a$) instead of the direct energy consumption metric ($E_d$). The actual energy consumption of a task $n_i$ on a processor $p_j$ with a supply voltage of $v_{j,k}$ is defined as $$E_a(n_i, p_j, v_{j,k}) = E_d(n_i, p_j, v_{j,k}) - E_i(n_i, p_j, v_{j,k}) \quad (10)$$

The modified MCER technique in some examples make reductions in energy consumption in a similar way to the previous counterpart; however, there are some cases in which reductions are made only if the modified MCER technique is used. For instance, a task assigned to a processor with a supply voltage of 1.50 has its computation cost being 10, and it is considered for another processor with 1.10 v on which the computation cost of that task is 20, the original MCER technique will not take this alternative allocation since the (direct) energy consumption for the latter allocation is higher. However, the modified MCER technique considering the actual energy consumption identifies the latter allocation ($E_a$=11.4) more energy efficient. This scenario is with an assumption that there is no increase in the makespan.

Figure 7:
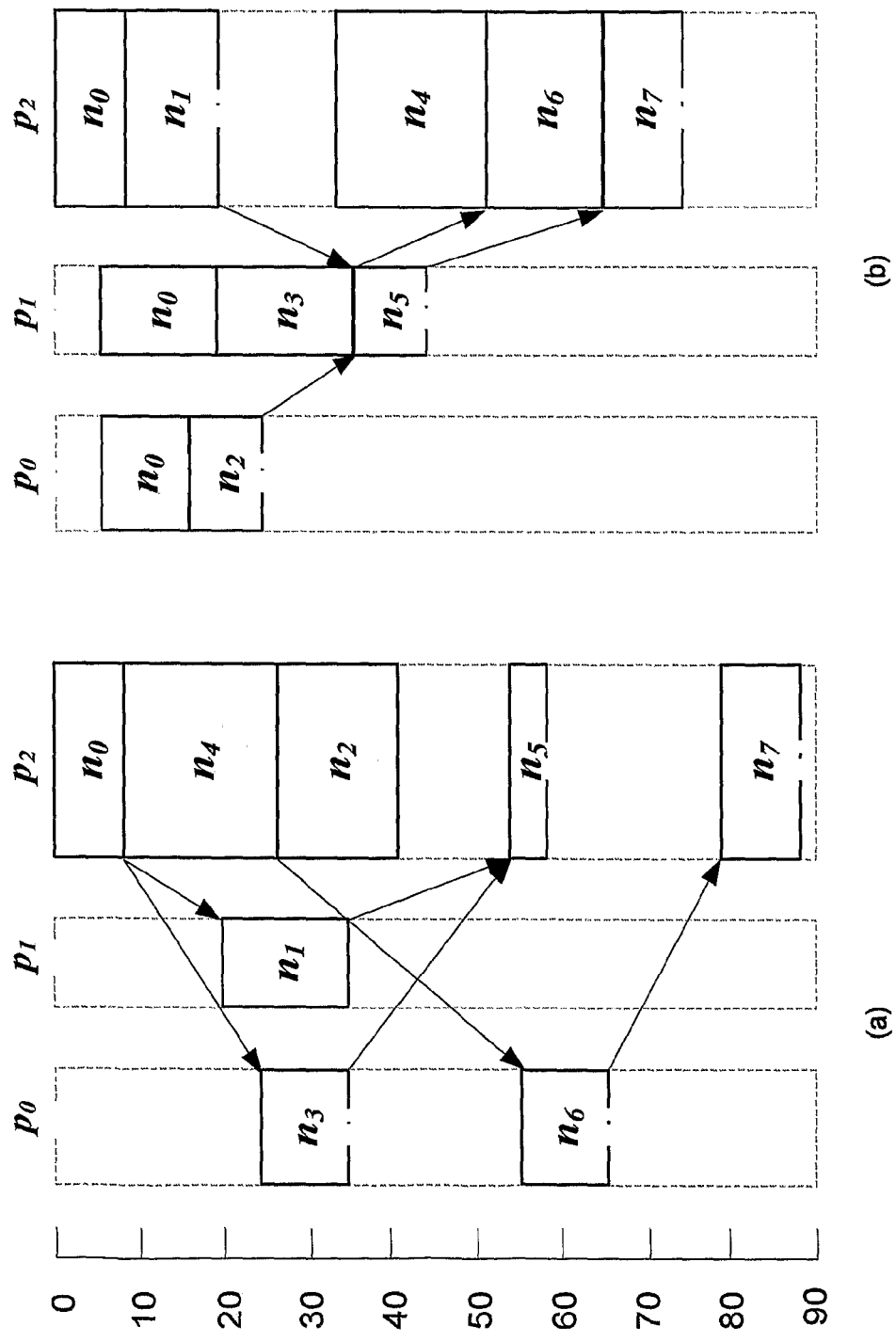
FIGS. 7(a) and 7(b) schematically show the schedules for the task graph of FIG. 1 produced by the HEFT algorithm and DBUS algorithm respectively (prior art)

For the working of ECS+idle, FIG. 6 can be referred with the two differences—in the RS objective function and the MCER technique—described earlier in this section. An example of ECS+idle scheduling is presented in FIG. 7.

Performance Analysis

We set out here qualitative implications of schedules that ECS and ECS+idle generate.

We first present two schedules generated by HEFT and DBUS for the task graph in FIG. 2 to show our algorithms' capability of energy reduction. These schedules are schematically show in FIG. 7(a) for HEFT (makespan=89) and DBUS (makespan=73) respectively. Since they are do not incorporate DVS or any other energy saving techniques into their scheduling, their output schedules tend to consume excessive energy in return for shortening makespan. However, our investigation into energy conscious scheduling has identified that this excessive energy consumption can be reduced without yielding poor makespan.

Figure 8:
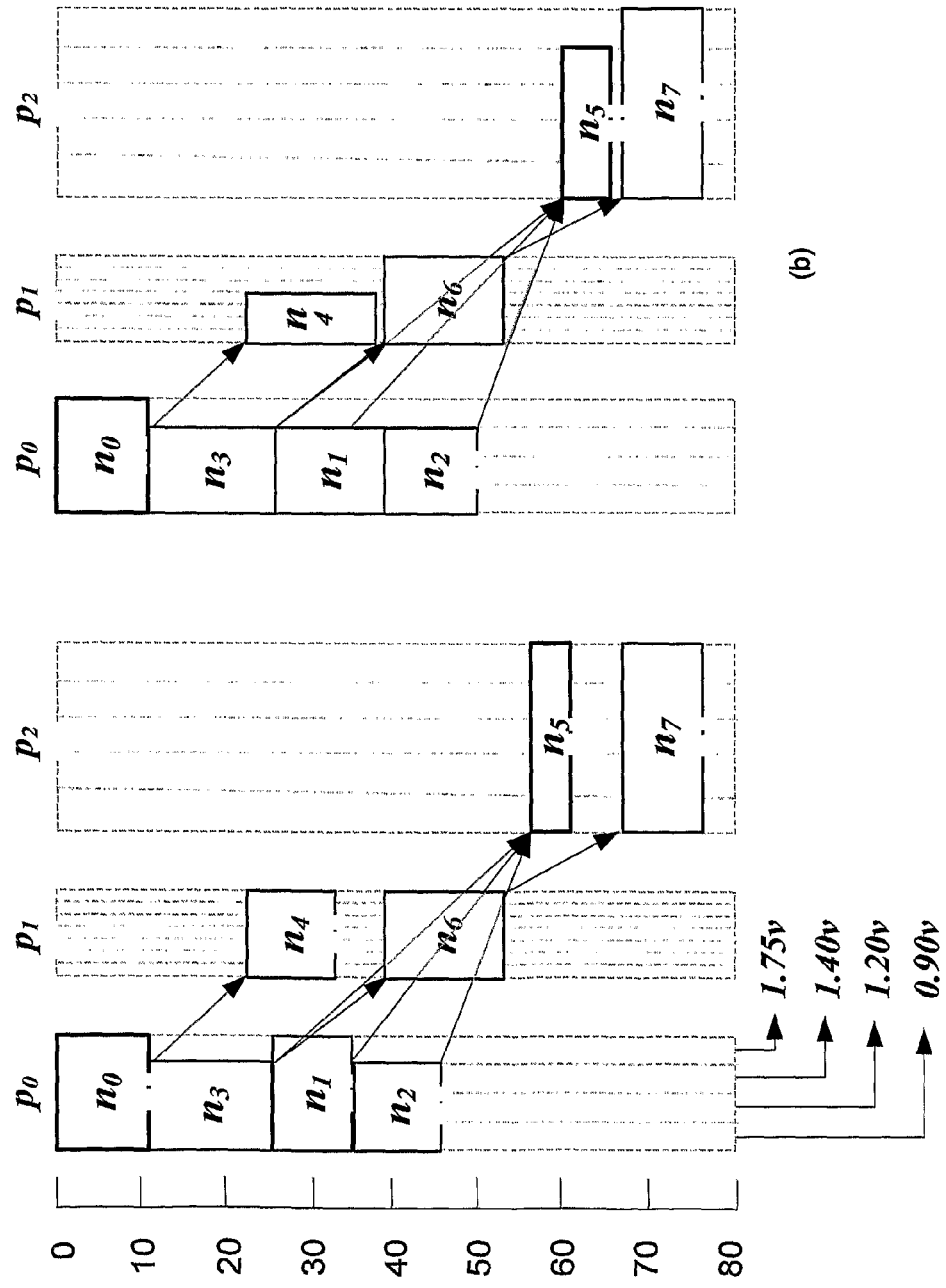
FIG. 8 schematically shows the schedules for the task graph of FIG. 1 produced in this example where (a) ECS without MCER is used, and in (b) ECS with MCER is used.
Figure 9:
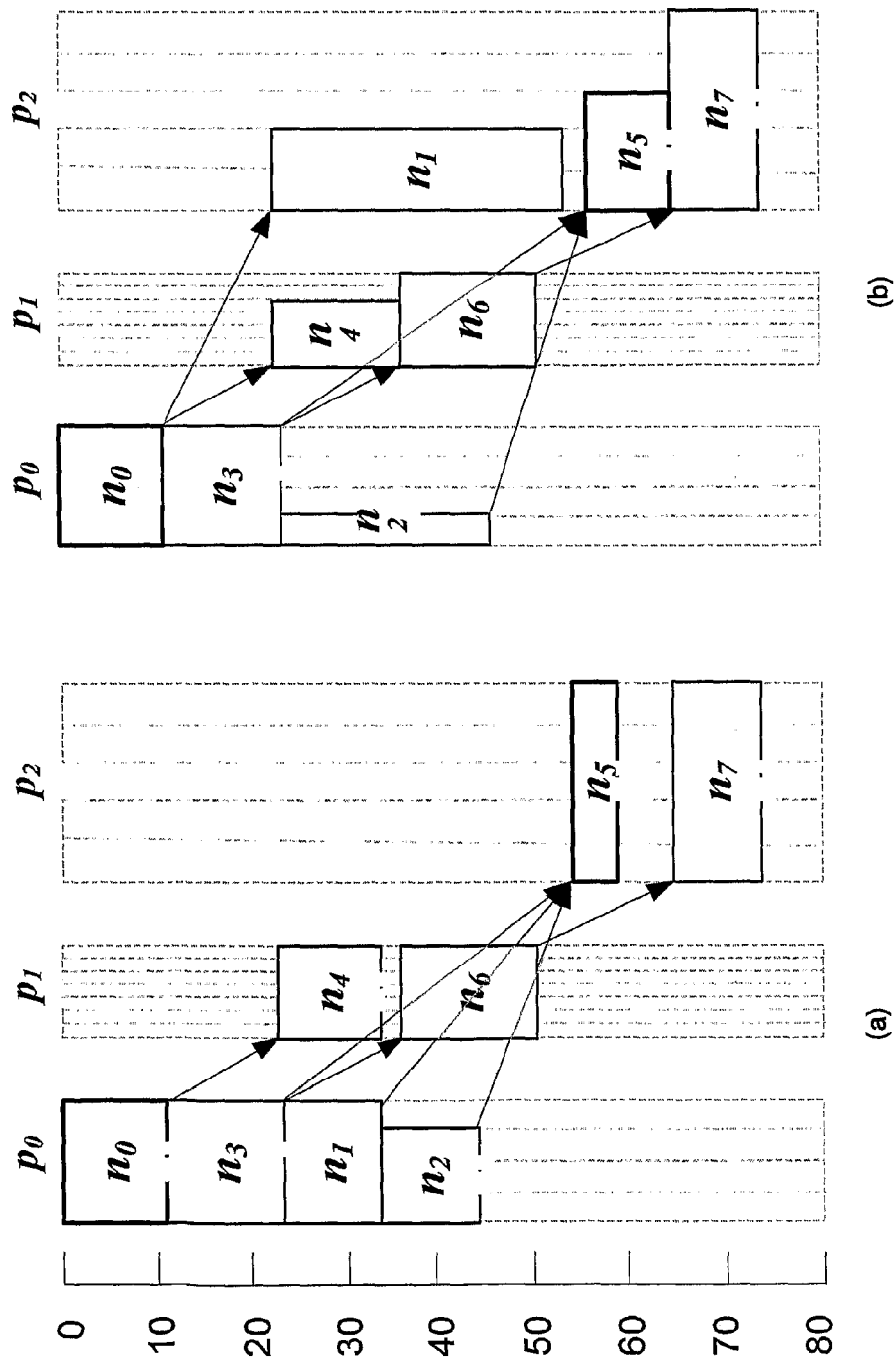
FIG. 9 schematically shows the schedule for the task graph of FIG. 1 produced in this example where (a) ECS+idle without MCER is used and (b) ECS+idle with MCER is used.

Examples of the scheduling produced by this example of the invention in FIGS. 8 and 9. Makespan is shown as the vertical axis and each processor $p_0$, $p_1$ and $p_2$ has its own column. Tasks assigned to a processor are noted on that processor's column in time order, with the width of the task indicative of the assigned voltage level to that task on that processor.

Here we present the results obtained from our extensive comparative evaluation study between ECS and ECS+idle, of the present example and two previously proposed heuristics HEFT and DBUS. This comparison between energy-conscious ECS and ECS+idle, and energy-unconscious HEFT and DBUS clearly demonstrates the energy saving capability of this example.

Experimental Settings

The performance of ECS and ECS+idle was thoroughly evaluated with two extensive sets of task graphs: randomly generated and real-world application. The three real-world parallel applications used for our experiments were the Laplace equation solver [6], the LU-decomposition [7] and Fast Fourier Transformation [8]. A large number of variations were made on these task graphs for more comprehensive experiments. In addition to task graphs, various different characteristics of processors were applied to simulations. The table of FIG. 11 summarizes the parameters used in our experiments.

The total number of experiments conducted with four different algorithms (HEFT, DBUS, ECS and ECS+idle) is 280,000 (i.e. 72,000 for each algorithm). Specifically, the random task graph set consisted of 150 base task graphs generated with combinations of 10 graph sizes, five CCRs and three processor heterogeneity settings. For each combination, 20 variant task graphs were randomly generated, retaining the characteristics of the base task graph. These 3,000 graphs were investigated with six different numbers of processors. Each of the three real-world applications was investigated using the same number of task graphs (i.e., 18,000); hence the figure 72,000.

The computational and communication costs of the tasks in each task graph were randomly selected from a uniform distribution, with the mean equal to the chosen average computation and communication costs. A processor heterogeneity value of 100 was defined to be the percentage of the speed difference between the fastest processor and the slowest processor in a given system. For the real-world application task graphs, the matrix sizes and the number of input points were varied, so that the number of tasks can range from about 10 to 600.

Comparison Metrics

Typically, the makespan of a task graph generated by a scheduling algorithm is used as the main performance measure; however, in this study, we consider energy consumption as another equally important performance measure. For a given task graph, we normalize both its makespan and energy consumption to lower bounds—the makespan and energy consumption of the tasks along the CP (i.e., CP tasks) without considering communication costs. Specifically, the 'schedule length ratio' (SLR) and 'energy consumption ratio' (ECR) were used as the primary performance metrics for our comparison. Formally, the SLR and ECR values of the makespan M and energy consumption $E_t$ of a schedule generated for a task graph G by a scheduling algorithm are defined as $$SLR = \frac{M}{\sum_{n_i \in CP} \min_{p_j \in P} \{w_{i,j}\}} \quad (11)$$

$$ECR = \frac{E_t}{\sum_{n_i \in CP} \min_{p_j \in P} \{w_{i,j}\} \times \max_{v_{j,k} \in V_j} \{v_{j,k}\}^2} \quad (12)$$

where CP is a set of CP tasks of G.

RESULTS

The entire simulation results we have conducted are summarized in the table of FIG. 12, FIG. 12 clearly signifies the superior performance of algorithms ECS and ECS+idle over DBUS and HEFT, irrespective of different DAG types. In addition, ECS and ECS+idle outperformed those two previous algorithms with various different CCRs.

Obviously, the primary purpose of task duplication is the minimization of communication overheads—which eventually reduces makespan—by redundantly scheduling some tasks. Task duplication might be an effective technique for communication-intensive applications; however, the incorporation of such a technique into scheduling algorithms should be avoided, or at least carefully considered, when energy consumption comes into play. Since DBUS is a duplication-based scheduling algorithm, its energy consumption is far greater than that of ECS.

The comparison between ECS and ECS+idle, and HEFT reconfirmed the favourable performance of ECS and ECS+idle particularly in terms of energy consumption. Note that, previously HEFT has been proven to perform very competitively with a low time complexity, and it has been frequently adopted and extended; this implies that the average SLR of ECS and ECS+idle with even a one percent margin shown in FIG. 10 is compelling.

The source of the main performance gain of ECS and ECS+idle is the use of the RS objective function, which contributes to reducing both makespan and energy consumption. In these experiments, a further 3.4 percent improvement and 3.9 percent improvements (on average) in energy consumption—for schedules after the main scheduling phase of ECS and ECS+idle were made by the MCER technique. These reductions are achieved in both direct and indirect energy consumption.

It will be appreciated by persons skilled in the art that numerous variations and/or modifications may be made to the invention as shown in the specific embodiments without departing from the scope of the invention as broadly described. The present embodiments are, therefore, to be considered in all respects as illustrative and not restrictive.

REFERENCES

[1] H. Topcuouglu, S. Hariri, and M.-Y. Wu, Performance-Effective and Low-Complexity Task Scheduling for Heterogeneous Computing, IEEE Trans. Parallel Distrib. Syst., Vol. 13, No. 3, pp. 260-274, 2002.
[2] J. G. Koomey, Estimating total power consumption by servers in the U.S. and the world.
[3] G. Koch, Discovering multi-core: extending the benefits of Moore's law, Technology@Intel Magazine, July 2005 (http://www.intel.com/technology/magazine/computing/multi-core-0705.pdf).
[4] M. R. Garey and D. S. Johnson, Computers and Intractability: A Guide to the Theory of NP-Completeness, W.H. Freeman and Co., pp. 238-239, 1979.
[5] D. Bozdag, U. Catalyurek and F. Ozguner, A task duplication based bottom-up scheduling algorithm for heterogeneous environments, Proc. Int'l Parallel and Distributed Processing Symp., April 2005.
[6] M.-Y. Wu and D. D. Gajski, Hypertool: A Programming Aid for Message-Passing Systems, IEEE Trans. Parallel and Distributed Systems, vol. 1, no. 3, pp. 330-343, July 1990.
[7] R. E. Lord, J. S. Kowalik, and S. P. Kumar, Solving Linear Algebraic Equations on an MIMD Computer, J. ACM, vol. 30, no. 1, pp. 103-117, January 1983.
[8] T. H. Cormen, C. E. Leiserson, and R. L. Rivest, Introduction to Algorithms, MIT Press, 1990.

Claims defining the invention are as follows:

1. A method for scheduling an application for performance on a heterogeneous computing system, wherein the application is comprised of two or more precedence constrained parallel tasks and the heterogeneous computing system is comprised of multiple processors, wherein each processor is enabled to operate on two or more voltage supply levels, the method comprising the steps of:
   determining a priority order for the tasks based on the computation and communication costs of the tasks; and
   in priority order of the tasks, assigning each task a combination of both a processor and a voltage level from the two or more voltage supply levels that substantially minimizes energy consumption and completion time for performing that task when compared to energy consumption and completion time for performing that task on different combinations of processor and voltage level.

2. A method according to claim 1, wherein substantially minimizing comprises determining for different combinations of task, processor and voltage level, a factor that represents both the energy consumption and time completion.

3. A method according to claim 2, wherein substantially minimizing comprises selecting the combination for assignment having a factor that represents substantially the best trade off between minimizing energy consumption and minimizing completion time.

4. A method according to claim 2, wherein determining the factor for energy consumption is based on a computation cost of that task at the voltage level of that combination.

5. A method according to claim 2, wherein determining the factor for completion time is based on a computation cost of that task on the processor and voltage level of that combination.

6. The method according to claim 5, wherein determining the factor for completion time is based on a summation of the estimated start time and the computation cost of that task on the processor and voltage level of that combination.

7. The method according to claim 6, wherein the estimated start time is based on a estimated finish time of a most influential task that precedes that task and, where appropriate, the communication cost between the processor assigned the most influential task to the processor of that combination.

8. A method according to claim 5, wherein determining the factor for completion time comprises penalizing tasks on processors and voltage level combinations that produce a longer completion time.

9. The method according to claim 1, where for each task the method further comprises the step of:
   determining the energy consumption and computation time for the task on different combinations of processor and voltage level;
   if for a combination the determined computation time does not cause an increase the makespan of the application, and the determined energy consumption is less than the energy consumption of the task on the assigned processor and assigned voltage, reassigning the task to that combination of processor and voltage level.

10. A method according to claim 1, wherein the priority of each task is based on computation and communication costs of each task respectively along the longest path of precedence constrained tasks that the task is a part of.

11. A method according to claim 10, wherein the priority of each task is based on the b-level or t-level of the task.

12. A method according to claim 1, wherein the method further comprises the step of performing the tasks according to the scheduling.

13. A method according to claim 1, wherein the heterogeneous computing system is a multi-processor computing system.

14. A method according to claim 1, wherein the tasks are heterogeneous.

15. A non-transitory computer readable medium having stored thereon instructions, that when executed by a computer system including multiple processors wherein each processor is enabled to operate on two or more voltage supply levels, cause the computer system to:
   determine a priority order for two or more precedence constrained parallel tasks based on the computation and communication costs of the tasks; and
   in priority order of the tasks, assign each task a combination of both a processor and a voltage level from the two or more voltage supply levels that substantially minimizes energy consumption and completion time for performing that task when compared to energy consumption and completion time for performing that task on different combinations of processor and voltage level.

16. A non-transitory computer readable medium having stored thereon a schedule for performing an application on a heterogeneous computing system including multiple processors wherein each processor is enabled to operate on two or more voltage supply levels, the schedule comprising:
   a priority order for two or more precedence constrained parallel tasks based on the computation and communication costs of the tasks; and
   a combination of both a processor and a voltage level from the two or more voltage supply levels assigned to each task, in priority order of the tasks, that substantially minimizes energy consumption and completion time for performing a task when compared to energy consumption and completion time for performing the task on different combinations of processor and voltage level.

17. A scheduling system to schedule applications for performance on a heterogeneous computing system, wherein the application is comprised of two or more precedence constrained parallel tasks and the heterogeneous computing system is comprised of multiple processors, wherein each processor is enabled to operate on two or more voltage supply levels, the scheduling module operable to:
   determine a priority order for the tasks based on the computation and communication costs of the tasks; and
   in priority order of the tasks, assign that task a combination of both a processor and a voltage level from the two or more voltage supply levels that substantially minimizes energy consumption and completion time for performing that task when compared to assigning the task to energy consumption and completion time for performing that task on different combinations of processor and voltage level.

* * * * *

UNITED STATES PATENT AND TRADEMARK OFFICE
CERTIFICATE OF CORRECTION

PATENT NO. : 8,959,370 B2
APPLICATION NO. : 13/121939
DATED : February 17, 2015
INVENTOR(S) : Albert Zomaya It is certified that error appears in the above-identified patent and that said Letters Patent is hereby corrected as shown below:

In the specification

In column 5 at line 7, Change "An edge (i, j)$_{\epsilon E}$" to --An edge (i, j) $\in E$--.

In column 5 at line 13, "the predecessors of a task the predecessor" to --the predecessors of a task $n_i$, the predecessor--.

In column 6 at line 41, Change "IDLE;" to --IDLE$_j$--.

In column 9 at lines 36-37,

Change "
$$RS(n_i, p_j, v_{j,k}, p', v') = \begin{cases} -\left( \begin{array}{c} \left(\dfrac{E(n_i, p_j, v_{j,k}) - E(n_i, p', v')}{E(n_i, p_j, v_{j,k})}\right) + \\ \left(\dfrac{EFT(n_i, p_j, v_{j,k}) - EFT(n_i, p', v')}{EFT(n_i, p_j, v_{j,k}) - EST(n_i, p_j, v_{j,k})}\right) \end{array} \right) & \text{if } EFT(n_i, p_j, v_{j,k}) < EFT(n_i, p', v') \\ -\left( \begin{array}{c} \left(\dfrac{E(n_i, p_j, v_{j,k}) - E(n_i, p', v')}{E(n_i, p_j, v_{j,k})}\right) + \\ \left(\dfrac{EFT(n_i, p', v') - EFT(n_i, p_j, v_{j,k})}{EFT(n_i, p', v') - EFT(n_i, p', v')}\right) \end{array} \right) & \text{if } EFT(n_i, p_j, v_{j,k}) \geq EFT(n_i, p', v') \end{cases}$$
"

Signed and Sealed this
Third Day of November, 2015

Michelle K. Lee
*Director of the United States Patent and Trademark Office*

$$RS(n_i, p_j, v_{j,k}, p', v') =$$

to --
$$\begin{cases} -\left( \left( \dfrac{E(n_i, p_j, v_{j,k}) - E(n_i, p', v')}{E(n_i, p_j, v_{j,k})} \right) + \left( \dfrac{EFT(n_i, p_j, v_{j,k}) - EFT(n_i, p', v')}{EFT(n_i, p_j, v_{j,k}) - EST(n_i, p_j, v_{j,k})} \right) \right) & \text{if } EFT(n_i, p_j, v_{j,k}) < EFT(n_i, p', v') \\ -\left( \left( \dfrac{E(n_i, p_j, v_{j,k}) - E(n_i, p', v')}{E(n_i, p_j, v_{j,k})} \right) + \left( \dfrac{EFT(n_i, p', v') - EFT(n_i, p_j, v_{j,k})}{EFT(n_i, p', v') - EFT(n_i, p', v')} \right) \right) & \text{if } EFT(n_i, p_j, v_{j,k}) \geq EFT(n_i, p', v') \end{cases}$$
--.